(12) United States Patent
Kim et al.

(10) Patent No.: US 11,782,169 B2
(45) Date of Patent: Oct. 10, 2023

(54) METHOD OF AND APPARATUS FOR UPDATING POSITION OF MOVING OBJECT BASED ON GNSS

(71) Applicant: SAMSUNG ELECTRONICS CO., LTD., Suwon-si (KR)

(72) Inventors: Joonha Kim, Suwon-si (KR); Jaebum Cho, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 17/197,512

(22) Filed: Mar. 10, 2021

(65) Prior Publication Data
US 2022/0043162 A1 Feb. 10, 2022

(30) Foreign Application Priority Data
Aug. 4, 2020 (KR) .................. 10-2020-0097542

(51) Int. Cl.
*G01S 19/40* (2010.01)
*G01S 19/51* (2010.01)
G01S 19/22 (2010.01)
G01S 19/42 (2010.01)
G01S 19/38 (2010.01)

(52) U.S. Cl.
CPC ............ *G01S 19/40* (2013.01); *G01S 19/51* (2013.01); *G01S 19/22* (2013.01); *G01S 19/38* (2013.01); *G01S 19/42* (2013.01); *G01S 19/428* (2013.01)

(58) Field of Classification Search
CPC .......... G01S 19/40; G01S 19/51; G01S 19/38; G01S 19/42; G01S 19/428; G01S 19/22

USPC ............ 342/357.23, 357.34, 357.25, 357.21, 342/357.61
See application file for complete search history.

(56) References Cited

U.S. PATENT DOCUMENTS

| 6,292,132 | B1 | 9/2001 | Wilson | |
| 6,917,330 | B2 * | 7/2005 | Ohmura | G01S 19/28 342/357.29 |
| 7,006,556 | B2 | 2/2006 | Abraham et al. | |
| 7,986,271 | B2 | 7/2011 | Kelly | |
| 7,987,047 | B2 | 7/2011 | Ishigami et al. | |
| 9,322,922 | B2 * | 4/2016 | Pratt | G01S 19/43 |

(Continued)

FOREIGN PATENT DOCUMENTS

| EP | 3663805 A1 * | 6/2020 | ........... B64G 1/1085 |
| JP | 2007284013 A * | 11/2007 | ............. B61L 25/02 |
| KR | 10-2020-0002221 A | 1/2020 | |

*Primary Examiner* — Chuong P Nguyen
(74) *Attorney, Agent, or Firm* — Sughrue Mion, PLLC

(57) ABSTRACT

A method of compensating a position of an object by using a Global Navigation Satellite System (GNSS) processor is provided. The method includes generating a compensated position associated with a target satellite at a compensation target time based on a pseudo range between the object and the target satellite at the compensation target time, generating a displacement vector of the object based on the compensated position at the compensation target time and a previous position of the object at a previous time that is prior to the compensation target time, determining a weight for the compensated position associated with the target satellite based on a velocity vector at the compensation target time and the displacement vector, and compensating a predicted position of the object according to the weight and the compensated position.

20 Claims, 11 Drawing Sheets

(56) References Cited

U.S. PATENT DOCUMENTS

| | | | |
|---|---|---|---|
| 9,846,239 B2* | 12/2017 | Cho | G01S 19/41 |
| 9,903,956 B2* | 2/2018 | Steinhardt | G01S 19/28 |
| 10,111,197 B2 | 10/2018 | Ronen | |
| 10,175,363 B2* | 1/2019 | Madhow | G01S 19/11 |
| 10,591,608 B2 | 3/2020 | Ibrahim et al. | |
| 2011/0291881 A1* | 12/2011 | Shirai | G01S 19/22 |
| | | | 342/357.25 |
| 2015/0219769 A1* | 8/2015 | Youssef | G01S 19/48 |
| | | | 342/357.31 |
| 2016/0280401 A1* | 9/2016 | Driscoll | G01S 5/011 |
| 2019/0353800 A1 | 11/2019 | Nirula et al. | |
| 2022/0097730 A1* | 3/2022 | Bacchus | G01S 19/485 |

* cited by examiner

METHOD OF AND APPARATUS FOR UPDATING POSITION OF MOVING OBJECT BASED ON GNSS

CROSS-REFERENCE TO RELATED APPLICATION

This application is based on and claims priority under 35 U.S.C. § 119 to Korean Patent Application No. 10-2020-0097542, filed on Aug. 4, 2020, in the Korean Intellectual Property Office, the disclosure of which is incorporated by reference herein in its entirety.

BACKGROUND

1. Field

Methods consistent with the present disclosure relate to a method of compensating a location of an object, and more particularly, to a method of determining a weight of a satellite being used in compensating a position of an object by using a Global Navigation Satellite System (GNSS).

2. Description of Related Art

The Global Navigation Satellite System (GNSS) provides location information of a ground object such as, for example, a mobile device by using a satellite orbiting around the Earth. The GNSS may include GNSS satellites and at least one GNSS receiver. Recently, as a GNSS receiver is included in a mobile system such as a terminal, location information of the terminal may be generated.

SUMMARY

It is an aspect to provide a Global Navigation Satellite System (GNSS) processor capable of accurately determining a position of an object by using a GNSS.

According to an aspect of one or more embodiments, there is provided a method including generating a compensated position associated with a target satellite at a compensation target time based on a pseudo range between the object and the target satellite at the compensation target time; generating a displacement vector of the object based on the compensated position at the compensation target time and a previous position of the object at a previous time that is prior to the compensation target time; determining a weight for the compensated position associated with the target satellite based on a velocity vector at the compensation target time and the displacement vector; and compensating a predicted position of the object according to the weight and the compensated position.

According to another aspect of one or more embodiments, there is provided a method including predicting the position of the object at a compensation target time, according to a velocity of the object; for each of a plurality of satellites, generating a compensated position for compensating the predicted position of the object with respect to the satellite, according to a pseudo range between the satellite and the object at the compensation target time; generating a displacement vector of the object for each of the plurality of satellites, based on the compensated position and a previous position of the object at a previous time with respect to the compensation target time; determining a weight of the compensated position with respect to each of the plurality of satellites, based on the displacement vector for each of the plurality of satellites and a velocity vector at the compensation target time; and estimating the position of the object based on the predicted position of the object, the weight with respect to each satellite, and the compensated position with respect to each satellite.

According to another aspect of one or more embodiments, there is provided a method including predicting the position of the object and a velocity vector at an estimation target time according to the position of the object and a velocity vector at a previous time that is prior to the estimation target time; compensating the predicted velocity vector based on a variance in pseudo ranges at the estimation target time and the previous time; generating a compensated position for each of a plurality of satellites based on a pseudo range between the object and the satellite at the estimation target time; generating a displacement vector of the object based on the compensated position and a previous position of the object at the previous time; determining a weight for each satellite based on the compensated velocity vector and the displacement vector; and estimating the position of the object based on the predicted position, the weight of each satellite, and the compensated position of each satellite.

BRIEF DESCRIPTION OF THE DRAWINGS

Various embodiments will be more clearly understood from the following detailed description taken in conjunction with the accompanying drawings in which.

DETAILED DESCRIPTION

Hereinafter, various embodiments will be described in detail with reference to the attached drawings.

Figure 1:
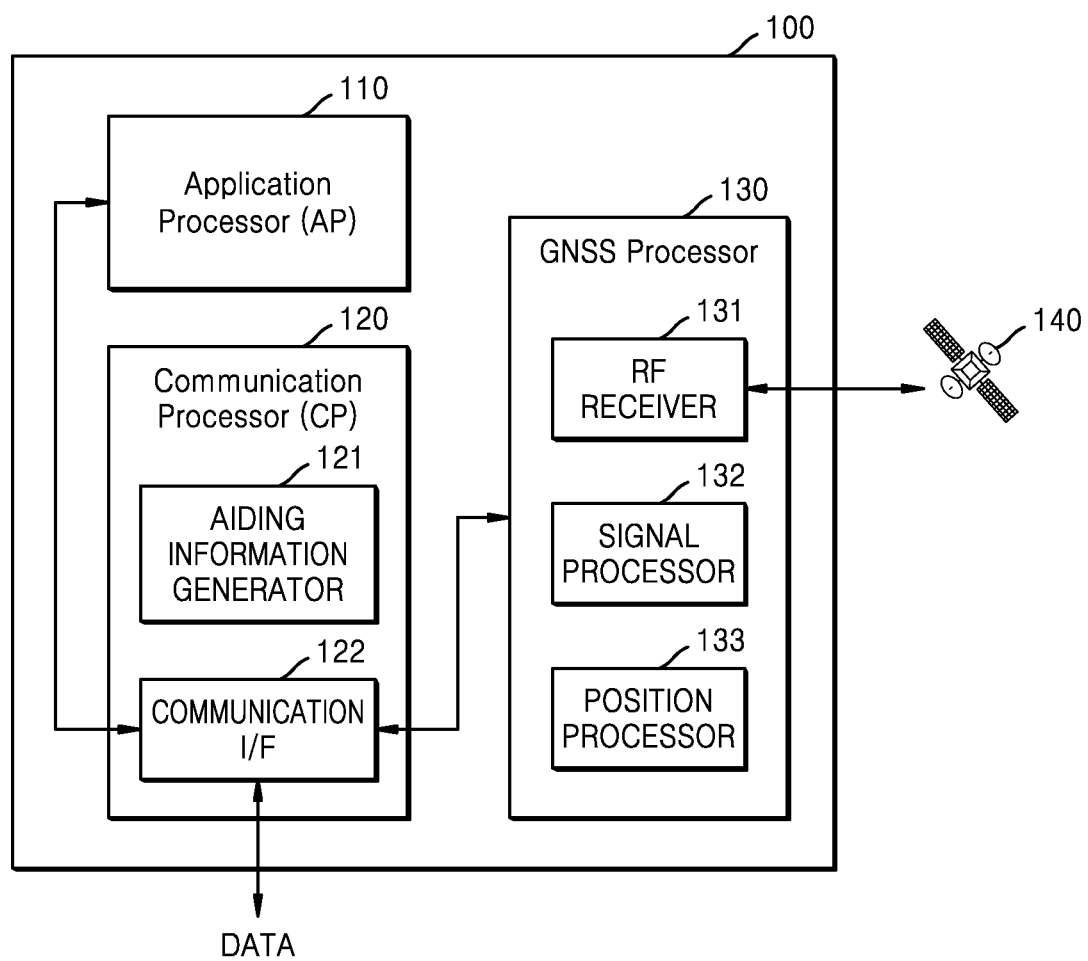
FIG. 1 is a block diagram of an apparatus for determining a position of an object, according to an embodiment.

FIG. 1 is a block diagram of an apparatus 100 for determining a position of an object, according to an embodiment. In some embodiments, the object may be the apparatus 100.

The apparatus 100 for determining the position of the object may include processors, and the processors may have different functions. That is, in some embodiments, the processors may be realized as chips that are respectively included in separate packages, but in other embodiments may be separate components having different functions in a chip included in one package. The apparatus 100 for determining the position of the object may be a System on Chip (SoC) or a user terminal including a SoC.

The apparatus 100 for determining the position of the object may include an application processor (AP) 110, a communication processor (CP) 120, and a Global Navigation Satellite System (GNSS) processor 130. The application processor 110 may perform an operation based on data received from the GNSS processor 130 and the communication processor 120, and the application processor 110 may execute an operating system (OS), an application, and the like by performing data processing.

The communication processor 120 may include an aiding information generator 121 and a communication interface (I/F) 122, and the GNSS processor 130 may include a radio frequency (RF) receiver 131, a signal processor 132, and a position processor 133. Communication processor 120 and GNSS processor 130 may be individually realized as hardware, but embodiments are not limited thereto. In some embodiments, the communication processor 120 and GNSS processor 130 may be software components performing different functions implemented as one piece of hardware.

The communication processor 120 may include the communication interface 122 and the aiding information generator 121, and the communication interface 122 may receive/transit data from/to an external device, the GNSS processor 130, and the application processor 110. The communication interface 122 may receive satellite information from the external device to quickly obtain a position of a target satellite 140. For example, the communication interface 122 may receive Almanac information and Ephemeris data as information associated with the target satellite 140, and the aiding information generator 121 may generate aiding information to identify the position of the target satellite 140 based on the Almanac information and the Ephemeris data. In addition, the communication interface 122 may receive the information associated with the target satellite 140 from a network that manages information regarding the target satellite 140. The apparatus 100 may predict the position of the object by directly receiving a signal from the target satellite 140, but because it may take quite some time to directly receive a signal from the target satellite 140, when it is possible to communicate with a network that manages information regarding the target satellite 140, the information associated with the target satellite 140 may be received from a network. For example, the communication interface 122 may receive coordinates of the target satellite 140 from the network. The aiding information generator 121 may generate aiding information based on information received from the communication interface 122, and since the position processor 133 of the GNSS processor 130 estimates the position of the object based on the aiding information, the accuracy of estimating the position of the object and positioning velocity may be improved.

The GNSS processor 130 may predict the position of the object and may compensate the position of the object according to the pseudo range with the target satellite 140, thereby predicting a position of the object. The GNSS processor 130 may include the RF receiver 131, the signal processor 132, and the position processor 133, and the RF receiver 131, the signal processor 132, and the position processor 133 may be divided according to functions that the GNSS processor 130 performs.

The RF receiver 131 may directly receive data regarding the object by directly receiving a radio signal from the target satellite 140 and may communicate with the communication processor 120 to receive aiding information from the communication processor 120 regarding the object as well. The signal processor 132 may provide position information of the target satellite 140 to the position processor 133 by decoding a radio signal that is broadcast from the target satellite 140.

The position processor 133 may predict the position of the object at a compensation target time, according to velocity at a previous time that is previous to the compensation target time in a propagation operation. The compensation target time may be a point in time when a position compensation of the object is required after a certain period of time has passed from the previous time, and the object may obtain, from the target satellite 140, a pseudo range between the object and the target satellite 140 at the compensation target time.

Then, the position processor 133 may compensate the position of the object, which is predicted in the propagation operation, based on the pseudo range between the object and the target satellite 140 at the compensation target time in an update operation. In addition, the position processor 133 may estimate a velocity vector at each point in time, based on a variance in pseudo ranges at each point in time and a previous time thereof. For example, the position processor 133 may estimate a second velocity vector at a second time, based on a variance in pseudo ranges at the second time and a previous time with respect to the second time.

The position processor 133 may generate a compensated position based on the pseudo range at the compensation target time and may generate, as a displacement vector, a difference between the compensated position and a previous position that is the position of the object at the previous time. The position processor 133 may determine a weight of the target satellite 140 according to a result of comparing the displacement vector with the velocity vector and may adjust the predicted position of the object according to the weight.

The apparatus 100 may include a SoC, and various components in the SoC may be connected to one another via a system bus (not shown). For example, as bus standards of the system bus, Advanced Microcontroller Bus Architecture (AMBA) protocols of Advanced RISC Machine (ARM) may be applied. Examples of a bus according to the AMBA protocols may include an Advanced High-Performance Bus (AHB), an Advanced Peripheral Bus (APB), an Advanced eXtensible Interface (AXI), AXI4, AXI Coherency Extensions (ACE), and the like.

Figure 2:
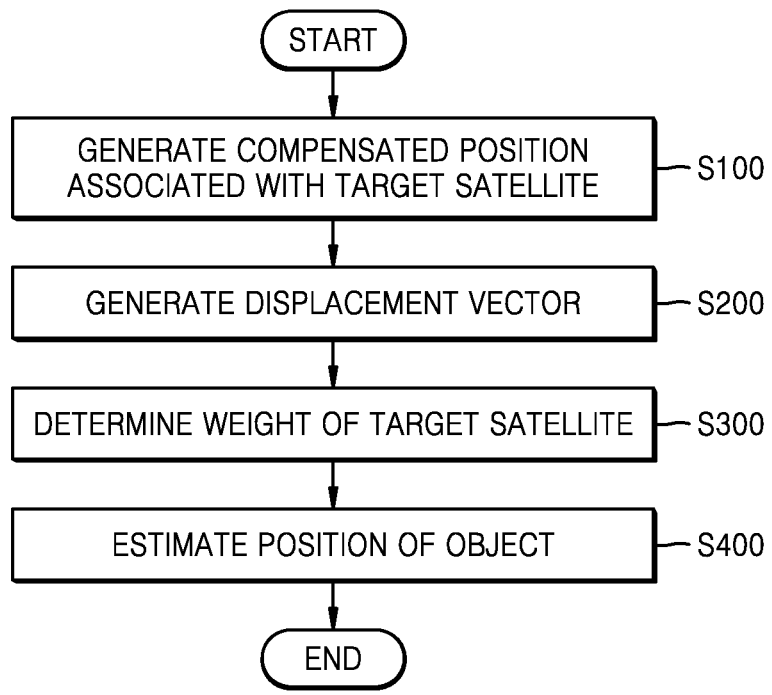
FIG. 2 is a flowchart of an example of a method of adjusting a position of an object, according to an embodiment.

FIG. 2 is a flowchart of an example of a method of compensating a position of an object, according to an example.

When compensating a position of an object, the GNSS processor 130 may generate the compensated position associated with a target satellite that is compensated with respect to a position of an object that is predicted based on a pseudo range between the object and the target satellite, may determine the accuracy of the compensated position by comparing a displacement vector, which is generated according to the compensated position, with a velocity vector, and thus may determine a reflection degree of the target satellite according to the accuracy of the compensated position.

In operation S100, the GNSS processor 130 may generate the compensated position associated with the target satellite. For example, the GNSS processor 130 may generate the compensated position associated with a target satellite for compensating the position of the object, based on the pseudo range between the object and the target satellite at the compensation target time. The compensation target time may be a point in time when a position compensation of the object is required after a certain period of time has passed from a previous time, and the GNSS processor 130 may obtain the pseudo range between the object and the target satellite from the target satellite at the compensation target time.

In operation S200, the GNSS processor 130 may generate the displacement vector of the object based on the position of the object at the compensated position, which is generated in operation S100, and the previous position. For example, the GNSS processor 130 may generate the displacement vector based on a difference between coordinates of the compensated position and coordinates of the previous position of the object. That is, the displacement vector may be generated by connecting the above coordinates.

In operation S300, the GNSS processor 130 may determine a weight for the compensated positon associated with the target satellite. For example, the GNSS processor 130 may determine a compensation reflection level of the target satellite as the weight, according to the displacement vector and a velocity vector of the object. The velocity vector of the object may be generated at a certain point in time and may be generated according to a variance in pseudo ranges at the compensation target time and the previous time. For example, the GNSS processor 130 may estimate the velocity vector by using a formula that is generated by differentiating the formula that is linearizing a position determination equation. The GNSS processor 130, which generates the displacement vector and the velocity vector, may determine the weight for the compensated position associated with the target satellite according to the similarity of the displacement vector and the velocity vector. The weight may be a value indicating a reflection level associated with the target satellite.

In operation S400, the GNSS processor 130 may estimate a position of the object according to the weight. For example, the GNSS processor 103 may adjust the compensated position associated with the target satellite according to the weight. When determining the position by using satellites, the GNSS processor 130 may estimate the position of the object by adjusting the compensated position associated with the target satellite to a position, which is estimated by some of the satellites, as the compensated position associated with the target satellite. Accordingly, when determining the position of the object at an estimation target time, the GNSS processor 130 may estimate the position of the object more accurately by adding a greater weight to a satellite having high reliability.

Figure 3:
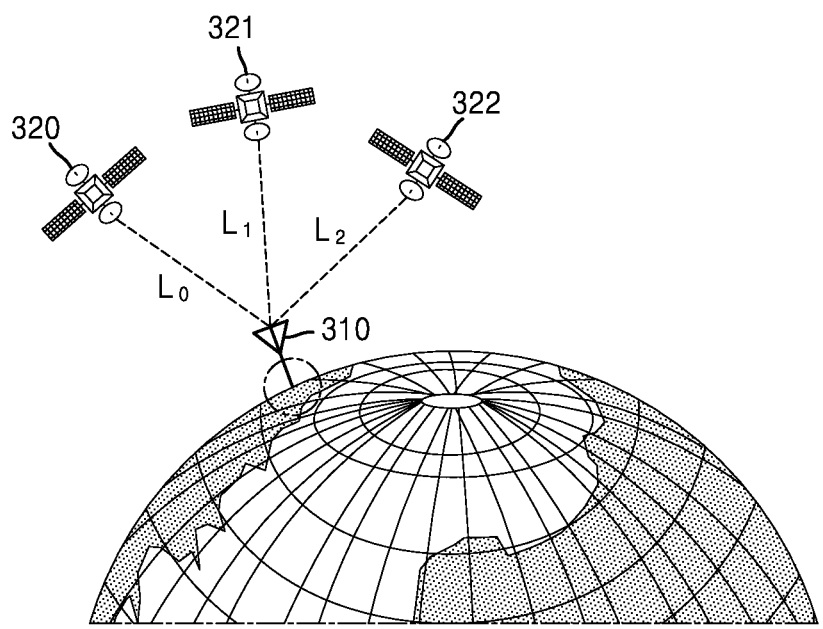
FIG. 3 is a diagram showing a method of tracking a position of an object by using a Global Navigation Satellite System (GNSS)

FIG. 3 is a diagram showing a method of tracking a position of an object 310 by using a GNSS.

According to an embodiment, the object 310 may be a device on which the communication processor 120 and the GNSS processor 130 of a user terminal, a wearable device, a vehicle, or the like may be mounted, and the communication processor 120 mounted on the object 310 may receive position information of a satellite from each of satellites 320, 321, and 322. In detail, the satellites 320, 321, and 322 may revolve around the Earth and may continuously broadcast the position information of the satellite as radio signals as they each revolve around the Earth, and the object 310 may obtain the position information of each of the satellites by receiving and decoding the radio signals of the satellites 320, 321, and 322.

The GNSS processor 130 of the object 310 may calculate pseudo range data, which is a distance between the satellite and the object 310, from the satellites 320, 321, and 322 and may determine the compensated position of the object 310 based on pseudo ranges $L_0$, $L_1$, and $L_2$ from the satellites 320, 321, and 322.

When the position of the object 310 at the previous time (i.e., a previous position) is stored in a memory connected to the GNSS processor 130, the GNSS processor 130 may generate the velocity vector and the compensated position at the compensation target time by using a Kalman filter, based on the pseudo range (one of the pseudo ranges $L_0$, $L_1$, and $L_2$) at the estimation target time. The Kalman filter may be a filter for processing data that continuously changes according to time. The GNSS processor 130 may predict a position and velocity of the object 310 at the compensation target time based on a position and velocity of the object 310 at the previous time and may finally estimate a position and velocity of the object 310 at the compensation target time by compensating a position and velocity of the object that is predicted. The GNSS processor 130 may compensate the predicted position and velocity of the object 310 according to a weight of each of the satellites 320, 321, and 322 a multiple number of times and may finally estimate all compensation results as the position and velocity of the object 310 at the compensation target time.

Figure 4:
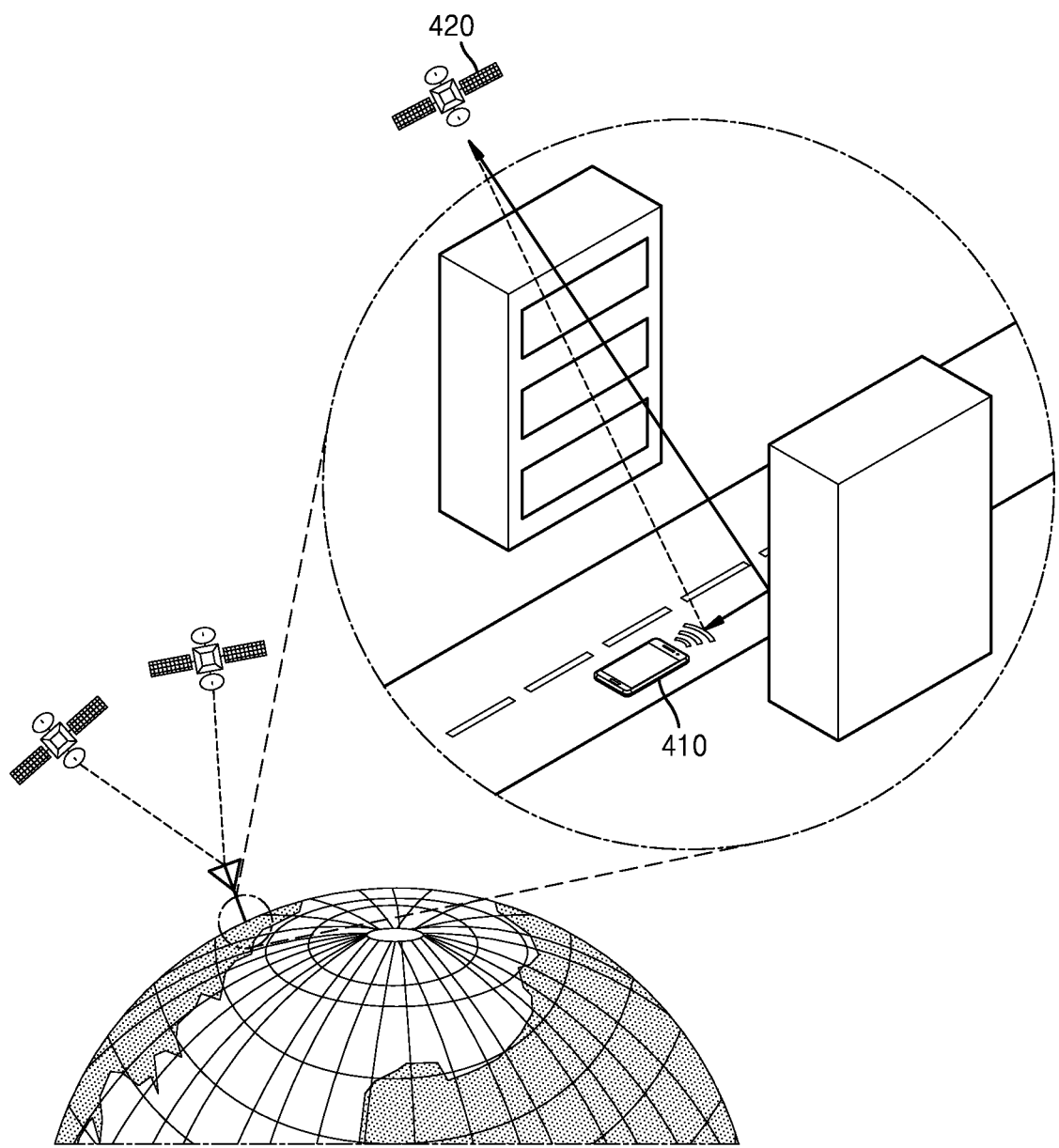
FIG. 4 is a diagram of an example of obtaining an inaccurate pseudo range due to an obstacle located between a target object and an object.

FIG. 4 is a diagram of an example in which an inaccurate pseudo range is obtained because an obstacle is located between a target satellite 420 and an object 410.

Referring to FIG. 4, the object 410 may be a user terminal (e.g., the apparatus 100 in some embodiments), and when the object 410 fails to communicate with the target satellite 420 in a line of sight (LoS) because of high-rise buildings and surrounding facilities in a downtown area, the object 410 may communicate with the target satellite 420 through scattered reflection of the satellite signal off of the high-rise buildings and surrounding facilities. In this case, a straight distance between the target satellite 420 and the object 410 is required to enable the GNSS processor 130 to accurately estimate a position of the object 410, and when reflection, diffraction, or interference occurs in a signal communicating with the target satellite 420, the GNSS processor 130 of the object 410 may not obtain the straight distance between the target satellite 420 and the object 410 as a pseudo range and thus may obtain a range of a signal, in which an error occurs, as the pseudo range. That is, the GNSS processor 130 may not obtain the straight distance between the target satellite 420 and the object 410 as the pseudo range in an area, for example, a downtown area, where high-rise buildings and facilities are concentrated, and in this case, the GNSS processor 130 may obtain, as the pseudo range, a distance including a certain error from the straight distance. The GNSS processor 130 may obtain the compensated position, which is estimated at the estimation target time, based on the pseudo range between the object 410 and the target satellite 420, and when the pseudo range includes an error, the compensated position may also include an error.

As the target satellite 420 and the object 410 communicate with each other in an LoS state, the GNSS processor 130 may compare the displacement vector with the velocity vector to determine whether a compensated position having high reliability may be obtained and may determine an accurate position of the object 410 according to a determination result.

Figure 5A:
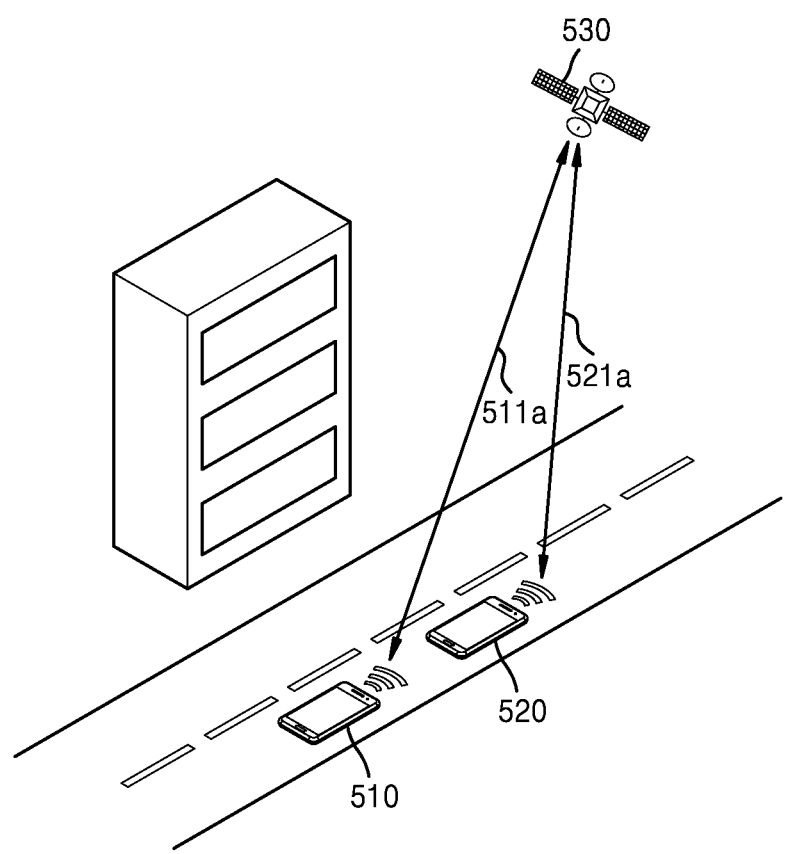
FIGS. 5A and 5B are diagrams of an example of estimating velocity vectors, according to an embodiment.
Figure 5B:
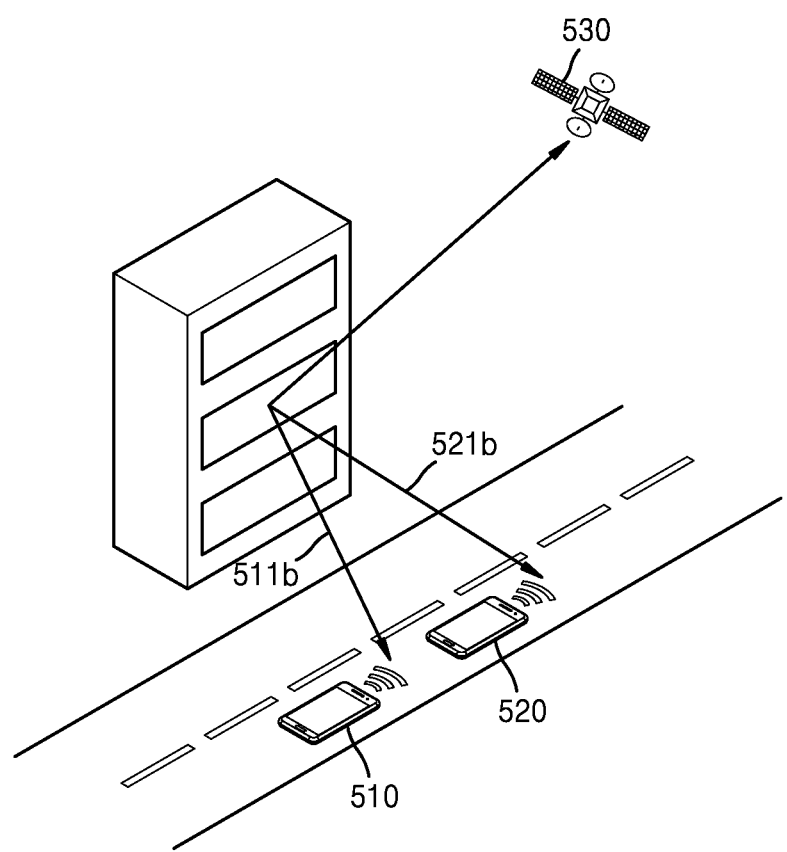

FIG. 5A is a diagram of an example of estimating a velocity vector at an estimation target time according to a variance in pseudo ranges of a first position 510 and a second position 520 when a target satellite and an object are in an LoS state, and FIG. 5B is a diagram of an example of estimating a velocity vector when the target satellite and the object are not in the LoS state.

Hereinafter, the above previous time may be referred to as a first time, and the compensation target time may be referred to as a second time. A position and a velocity vector of the object at the first time may be respectively referred to as the first position 510 and a first velocity vector, and a position and a velocity vector of the object at the second time may be respectively referred to as the second position 520 and a second velocity vector.

Referring to FIG. 5A, the GNSS processor 130 may predict the second position 520 and the second velocity vector based on the first position 510 and the first velocity vector, by using the Kalman filter in a propagation operation. Then, the GNSS processor 130 may obtain a first pseudo range 511a by measuring a time or a phase difference of waves transmitted from the target satellite at the first time and may obtain a second pseudo range 521a from the target satellite at the second time. In this case, the GNSS processor 130 may compensate the second velocity vector, which is predicted in the propagation operation, according to a variance in the first pseudo range 511a and the second pseudo range 521a regarding a temporal change in the first and second points in time and thus may estimate the second velocity vector.

That is, the GNSS processor 130 may estimate the velocity vector at the second time by performing Kalman filtering on the pseudo ranges measured at the first and second points in time and a variance in the pseudo ranges.

Referring to FIG. 5B, when the object may not communicate with the target satellite in the LoS state, the object may communicate with the target satellite by using a reflection signal from a high-rise building or a facility. In this case, as described with reference to FIG. 4, because a communication range between the object and the target satellite is not straight, the GNSS processor 130 may not obtain an accurate pseudo range, and a first pseudo range 511b and a second pseudo range 521b may be pseudo ranges that include an error from an actual range between the target satellite and the object.

The GNSS processor 130 may obtain the velocity vector of the object based on a movement direction and the variance in the pseudo range of the target satellite, and when two different points in time are close to each other, pseudo range errors measured at two points in time may be similar to each other. Although the pseudo ranges include errors because of multi-paths, such errors may be mostly offset when the variance in the pseudo ranges is calculated. That is, when the pseudo ranges obtained by the GNSS processor 130 at the first and second points in time are pseudo ranges obtained from signals that are reflected from surrounding buildings, error ranges generated according to the reflection may be offset. Therefore, although the GNSS processor 130 fails to obtain an accurate pseudo range in the LoS state, the variance in the pseudo ranges still may have the high reliability compared to the pseudo range.

Figure 6:
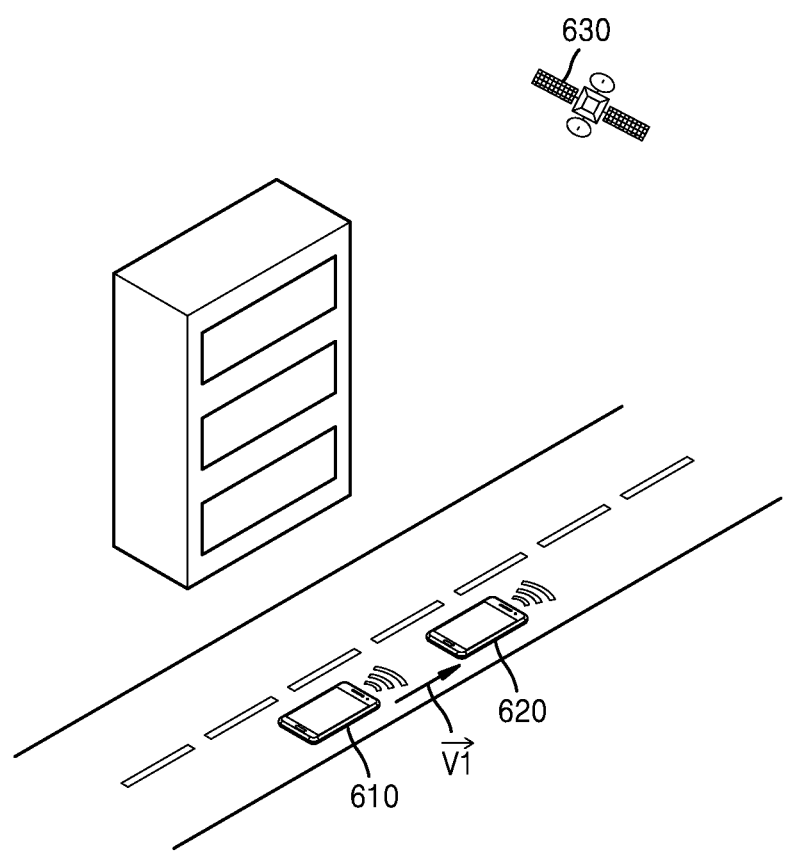
FIG. 6 is a diagram of an example of predicting a position of an object based on velocity, according to an embodiment.

FIG. 6 is a diagram of an example of predicting a position of an object based on velocity, according to an example.

Referring to FIGS. 5A and 5B, the GNSS processor 130 may measure velocity of the object at the first time (i.e., when the object is at a first positon 610) according to a variance in pseudo ranges at the first time and a previous time with respect to the first time and may predict the position of the object by calculating a second position 620 at the second time that is moved from the first position 610 according to the velocity of the object.

The GNSS processor 130 may predict the second position 620 from the velocity at the first time, according to the Equation of motion. The GNSS processor 130 may predict a direction of the second position 620 from the first position 610 based on a direction of the first velocity vector V1 and may predict how far the second position 620 is from the first position 610 based on a size of the first velocity vector V1. For example, the GNSS processor 130 may predict the direction of the second position 620 in a direction that is identical to the direction of the first velocity vector V1 and may predict the second position 620 by adding the first position 610 to a value that is obtained by multiplying the size of the first velocity vector V1 and a temporal gap between the first and second points in time.

Referring to FIG. 6, the GNSS processor 130 may predict a position at the second time from a position at the first time, according to velocity at the first time. In addition, the predicted position of the object may be compensated according to the pseudo ranges of the satellites obtained at the second time and the variance in the pseudo ranges to finally compensate the position of the object.

Figure 7:
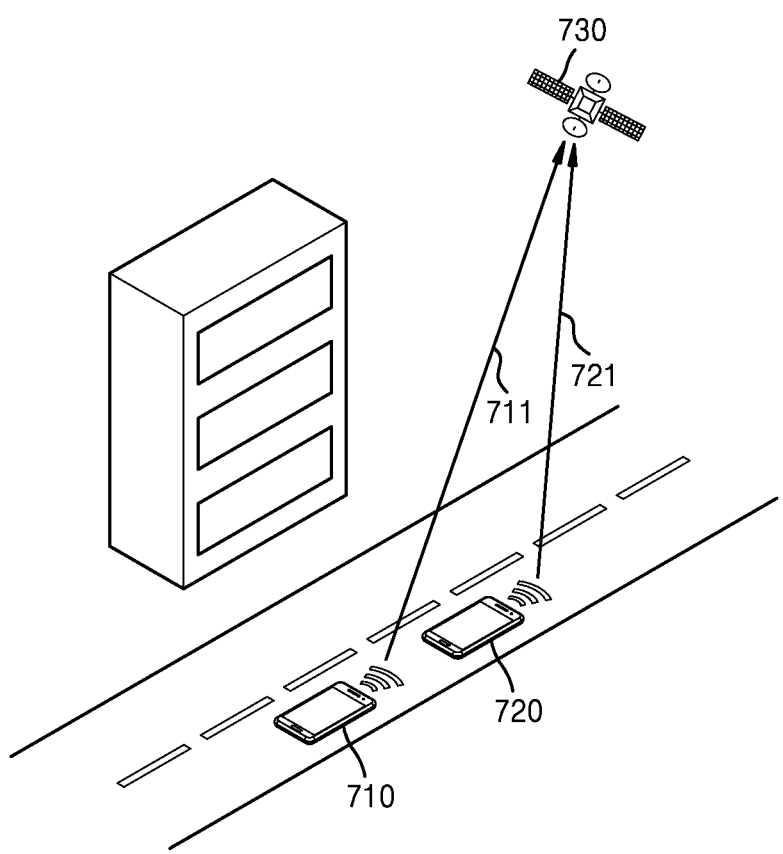
FIG. 7 is a diagram of an example of generating a compensated position of an object when multi-paths are not generated in communication between an object and a target satellite, according to an embodiment.

FIG. 7 is a diagram of an example of generating a compensated position of an object when multi-paths are not generated in communication between an object and a target satellite 730, according to an embodiment.

Referring to FIG. 7, the GNSS processor 130 may generate a first position 710 and a second position 720 based on a first pseudo range 711 and a second pseudo range 721, which are measured at the first time and the second time, respectively, and may determine the second position 720, which is obtained according to the second pseudo range 721, as a compensated position 720 of the target satellite 730. According to the embodiment of FIG. 7, in some cases, the second position 720, which is estimated and obtained by the GNSS processor 130 at the second time, may differ from the second position 620 predicted and obtained according to the velocity of the object of FIG. 6.

Since the object generally is in communication with plural satellites (see, e.g., FIGS. 3-4), the object may obtain a plurality of the second pseudo ranges 721 at the second time, and a GNSS may generate multiple compensated positions respectively based on the plurality of the second pseudo ranges 721. In the example illustrated in FIG. 7, the target satellite 730 may communicate with the object in the LoS state without reflection from surrounding facilities, and in this case, the GNSS processor 130 may obtain, as the pseudo range, a straight distance between the target satellite 730 and the object. Therefore, the GNSS processor 130 may generate a position, which is similar to an actual position of the object at the second time, as a compensated position of the target satellite 730 by using the Kalman filter.

Figure 8:
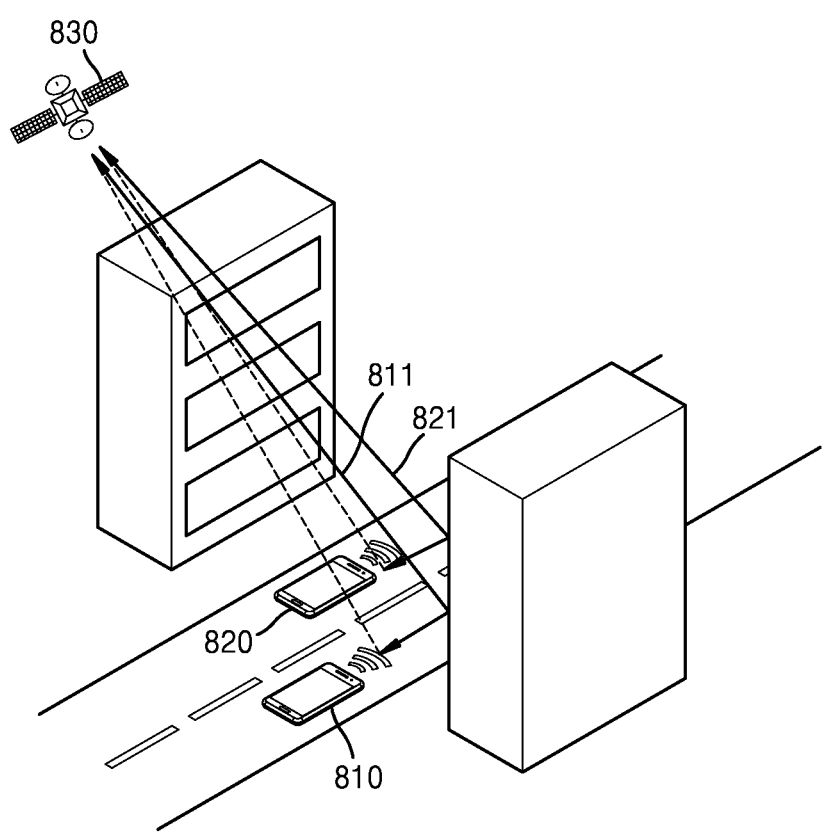
FIG. 8 is a diagram of an example of generating a position of an object when multi-paths are generated in communication between an object and a target satellite, according to an embodiment.

FIG. 8 is a diagram of an example of generation a position of an object when multi-paths are generated in communication between an object and a target satellite 830, according to an embodiment.

Referring to FIG. 8, the object and the target satellite 830 may not perform LoS communication because of surrounding buildings, and the GNSS processor 130 may receive waves that are broadcast from the target satellite 830 in response to signals reflected from other surrounding buildings. In this case, the GNSS processor 130 at the second time may obtain a second pseudo range 821 in response to the signals reflected from the surrounding buildings. For example, the GNSS processor 130 may obtain a time or a phase difference of waves by receiving signals that are broadcast by a positioning satellite. In this case, when the GNSS processor 130 receives the signals after they are reflected from the surrounding buildings, a pseudo range may be greater than a distance between an actual satellite and an object.

When the second pseudo range 821 includes an error after being compared with an actual straight distance, the GNSS processor 130 may generate a compensated position 820 by using the Kalman filter and may generate the second position 820, which is inaccurate compared to a case when a pseudo range is obtained through LoS communication, as the compensated position 820. The GNSS processor 130 may compare the velocity vector at the second time with displacement vectors at first and second points in time and thus may determine a weight of the compensated position 820.

Figure 9:
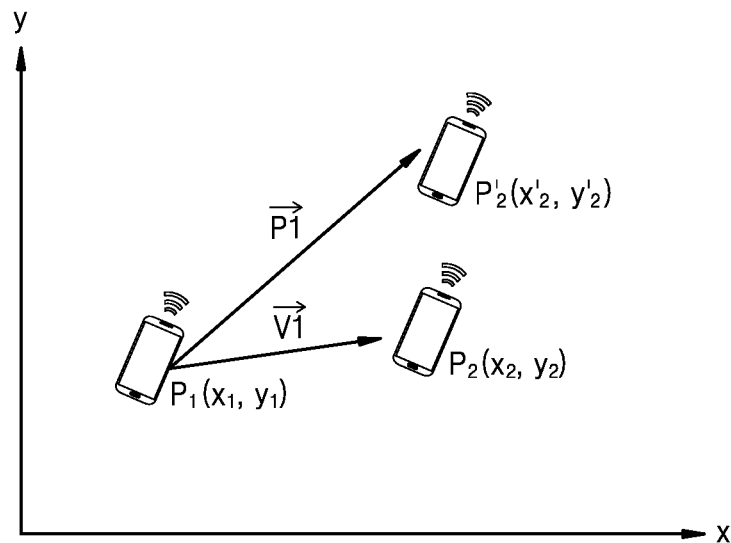
FIG. 9 illustrates a coordinate system for showing a position of an object, which is predicted according to velocity, and a compensated position of the object, which is obtained according to a pseudo range, according to an embodiment.

FIG. 9 illustrates a coordinate system for showing a position of an object, which is predicted according to velocity, and a compensated position of the object, which is generated according to a pseudo range, according to an embodiment.

The GNSS processor 130 according to an embodiment may determine a first position $P_1$ of the object at the first time and may estimate a first velocity vector $\vec{V1}$ at the first position $P_1$ by using the Kalman filter. The GNSS processor 130 may estimate the first velocity vector $\vec{V1}$ by substituting a variance in pseudo ranges at the first time and the previous time with respect to the first time for a formula obtained by differentiating the linear position determination equation.

Then, a second position $P_2$ of the object at the second time may be predicted based on the first velocity vector $\vec{V1}$, and a compensated position $P'_2$ of the object at the second time may be generated according to pseudo ranges from satellites. The GNSS processor 130 may measure a pseudo range from the target satellite from among the satellites or receive pseudo range information from the target satellite and may generate the compensated position $P'_2$ of the object at the second time based on the pseudo range from the target satellite. In this case, the GNSS processor 130 may generate a displacement vector $\vec{P1}$ based on a difference between the first position $P_1$ and the compensated position $P'_2$.

Referring to FIG. 9, the GNSS processor 130 may designate the first position $P_1$, the second position $P_2$, and the compensated position $P'_2$ as coordinates on a two-dimensional (2D) coordinate system including an X axis and a Y axis and may generate the displacement vector $\vec{P1}$ based on a difference between coordinates of the first position $P_1$ and the compensated position $P'_2$. The generation of the displacement vector $\vec{P1}$ by the GNSS processor 130 is not limited to the generation of the displacement vector $\vec{P1}$ based on position coordinates of FIG. 9 and may include generation of the displacement vector $\vec{P1}$ based on a difference between coordinates of two positions in a polar coordinate system.

For example, the GNSS processor 130 may generate the displacement vector $(\vec{P1}((x'2-x1), (y'2-y1)))$ based on a difference between first position coordinates $(P_1(x_1, y_1))$ and compensated position coordinates $(P'_2(x'_2, y'_2))$ in a 2D coordinate system of FIG. 9. In this case, the velocity vector $\vec{V1}$ may correspond to a difference between the first position coordinates $(P_1(x_1, y_1))$ and second position coordinates $(P_2(x_2, y_2))$.

Figure 10:
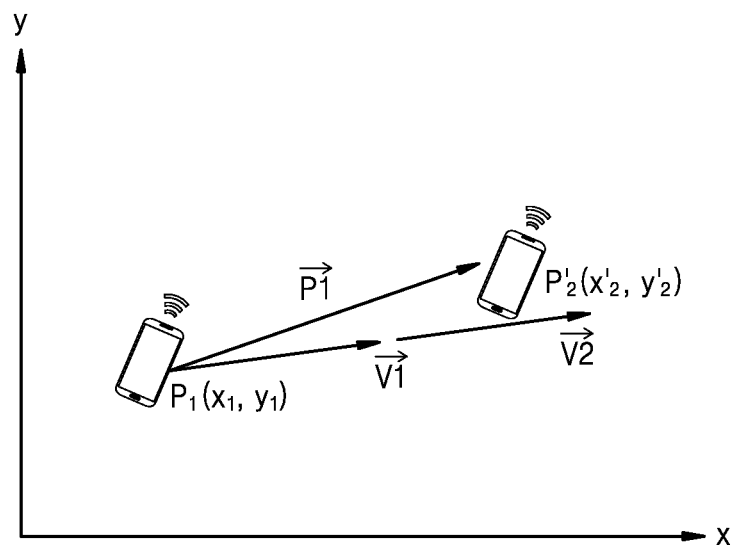
FIG. 10 illustrates a coordinate system for showing a relationship between a velocity vector and a displacement vector when multi-paths are not generated in communication between an object and a target satellite, according to an embodiment.
Figure 11:
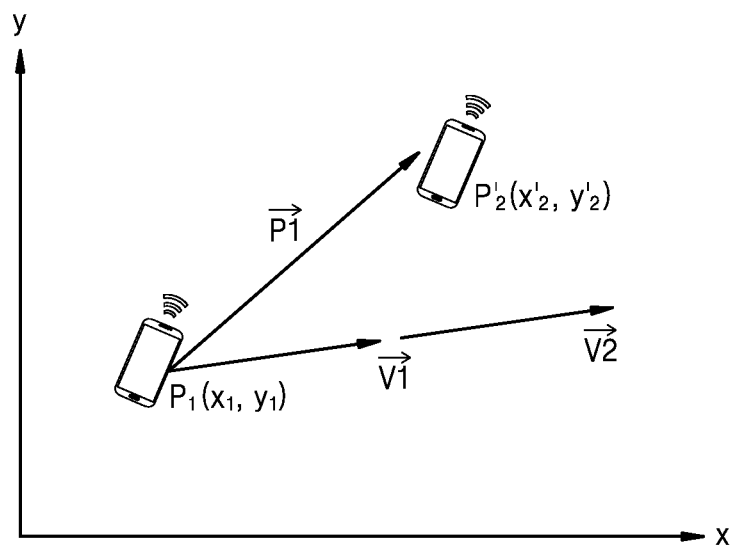
FIG. 11 is a diagram showing a relationship between a velocity vector and a displacement vector when multi-paths are generated in communication between an object and a target satellite, according to an embodiment.

FIG. 10 illustrates a diagram showing for a relationship between a second velocity vector $\vec{V2}$ and the displacement vector $\vec{P1}$ when multi-paths are not generated in communication between an object and a target satellite, according to an embodiment, and FIG. 11 is a diagram showing a relationship between the second velocity vector $\vec{V2}$ and the displacement vector $\vec{P1}$ when multi-paths are generated in communication between the object and the target satellite, according to an embodiment.

As described above, the GNSS processor 130 may estimate the second velocity vector $\vec{V2}$ based on a variance in pseudo ranges with the target satellite at the first and second points in time, and the variance in the pseudo ranges may be a parameter having relatively higher reliability than the pseudo range in an environment in which the multi-paths are generated. Therefore, a direction of the second velocity vector $\vec{V2}$ may correspond to a movement direction of an actual object at the first time to the second time, and the GNSS processor 130 may determine the compensated position $P'_2$ of the target satellite as a compensated position based on a degree in which the displacement vector $\vec{P1}$ is similar to the second velocity vector $\vec{V2}$.

For example, referring to FIG. 10, when the object communicates with the target satellite in the LoS state, a direction of the displacement vector $\vec{P1}$, which is generated based on the pseudo range with the target satellite, may be similar to the direction of the second velocity vector $\vec{V2}$. On the contrary, referring to FIG. 11, when the object may not communicate with the target satellite in the LoS state, the similarity of the direction of the displacement vector $\vec{P1}$, which is generated based on the pseudo range with the target satellite, with the direction of the second velocity vector $\vec{V2}$ may decrease, compared to a case where the object communicates with the target satellite in the LoS state. That is, the GNSS processor 130 may place a greater weight when the similarity of the second velocity vector $\vec{V2}$ with the displacement vector $\vec{P1}$ is high and may place a smaller weight when the similarity of the second velocity vector $\vec{V2}$ with the displacement vector $\vec{P1}$ is low.

According to an embodiment, the GNSS processor 130 may determine a weight of the target satellite by using inner product values of the second velocity vector $\vec{V2}$ with the displacement vector $\vec{P1}$. For example, because sizes of vectors differ according to a temporal gap between the first and second points in time, the GNSS processor 130 may generate a displacement unit vector and a velocity unit vector that only include direction information of the displacement vector $\vec{P1}$ and the second velocity vector $\vec{V2}$. The GNSS processor 130 may calculate inner product values of the displacement unit vector and the velocity unit vector, and the inner product values may have real numbers that are greater than or equal to −1 and less than or equal to 1.

When the inner product value is equal to −1, the displacement unit vector and the velocity unit vector are in opposite directions, and when the inner product value is equal to 1, the displacement unit vector and the velocity unit vector are in the same direction. Thus, the GNSS processor 130 may determine a weight, which is proportional to the inner product value, as a weight. For example, when an inner product value based on information, which is obtained from a first satellite, is 0.8, the GNSS processor 130 may place a weight of 0.8 to a first compensated position estimated by the first satellite, and when an inner product value based on information, which is obtained from a second satellite, is 0.3, the GNSS processor 130 may place a weight of 0.3 to a second compensated position estimated by the second satellite. The GNSS processor 130 may determine that the first compensated position has higher reliability than the second compensated position, and accordingly, a position that is closer to the first compensated position may be determined as the position of the object.

According to the above embodiment, the GNSS processor 130 determines the similarity of the displacement vector $\vec{P1}$ and the second velocity vector $\vec{V2}$ based on the inner product values thereof, but the similarity between the displacement vector $\vec{P1}$ and the second vector $\vec{V2}$ is not limited thereto. All methods of determining the similarity of two different vectors by using an Euclidean distance and Cosine similarity may be used.

Figure 12:
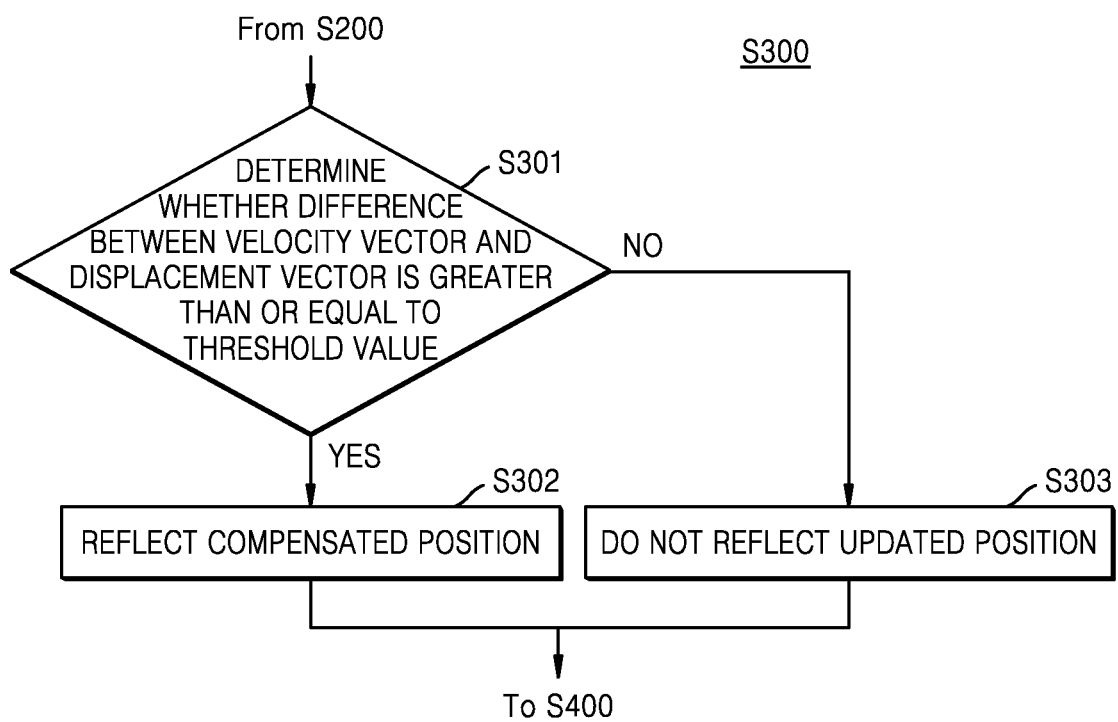
FIG. 12 is a flowchart of an example of determining a weight of a target satellite according to an embodiment.

FIG. 12 is a flowchart of an example of determining a weight of a target satellite. The process illustrated in FIG. 12 may be used to determine the weight in operation S300 of FIG. 2.

When the GNSS processor 130 determines a weight in operation S300 of FIG. 2, a determination as to whether a compensated position associated with the target satellite, which is generated according to whether the velocity vector and the displacement vector satisfy conditions, is used as the position of the object may be made.

In operation S301, the GNSS processor 130 may determine whether a difference between the velocity vector and the displacement vector is equal to or greater than a threshold value. In this case, the GNSS processor 130 may calculate the inner product values of the velocity vector and the displacement vector and may determine whether the inner product values satisfy conditions. For example, when the inner product values of the velocity vector and the displacement vector are equal to or greater than reference inner product values, the GNSS processor 130 may determine whether the difference between the velocity vector and the displacement vector is equal to or greater than the threshold value by determining the similarity of the velocity vector and the displacement vector is high. On the contrary, when the inner product values of the velocity vector and the displacement vector are less than reference inner product values, the GNSS processor 130 may determine that the difference is less than or equal to the threshold value by determining the similarity of the velocity vector and the displacement vector is low.

In operation S302, when the GNSS processor 130 determines that the difference between the velocity vector and the displacement vector satisfies the standard conditions (i.e., the similarity between the velocity vector and the displacement vector is high) (operation S301, YES), the GNSS processor 130 may reflect the compensated position, which is generated by the target satellite, as the position of the object. That is, the GNSS processor 130 may use the compensated position associated with the target satellite as the position of the object. For example, the GNSS processor 130 may place a weight of '1' to the compensated position associated with the target satellite.

In operation S303, when it is determined that the difference between the velocity vector and the displacement vector fails to satisfy the standard conditions (.e., the similarity between the velocity vector and the displacement vector is low) (operation S301, NO), the GNSS processor 130 may not reflect the compensated position, which is associated with the target satellite, to the position of the object. That is, the GNSS processor 130 may not use the compensated position associated with the target satellite as the position of the object. For example, the GNSS processor 130 may place a weight of '0' to the compensated position that is associated with the target satellite.

Figure 13:
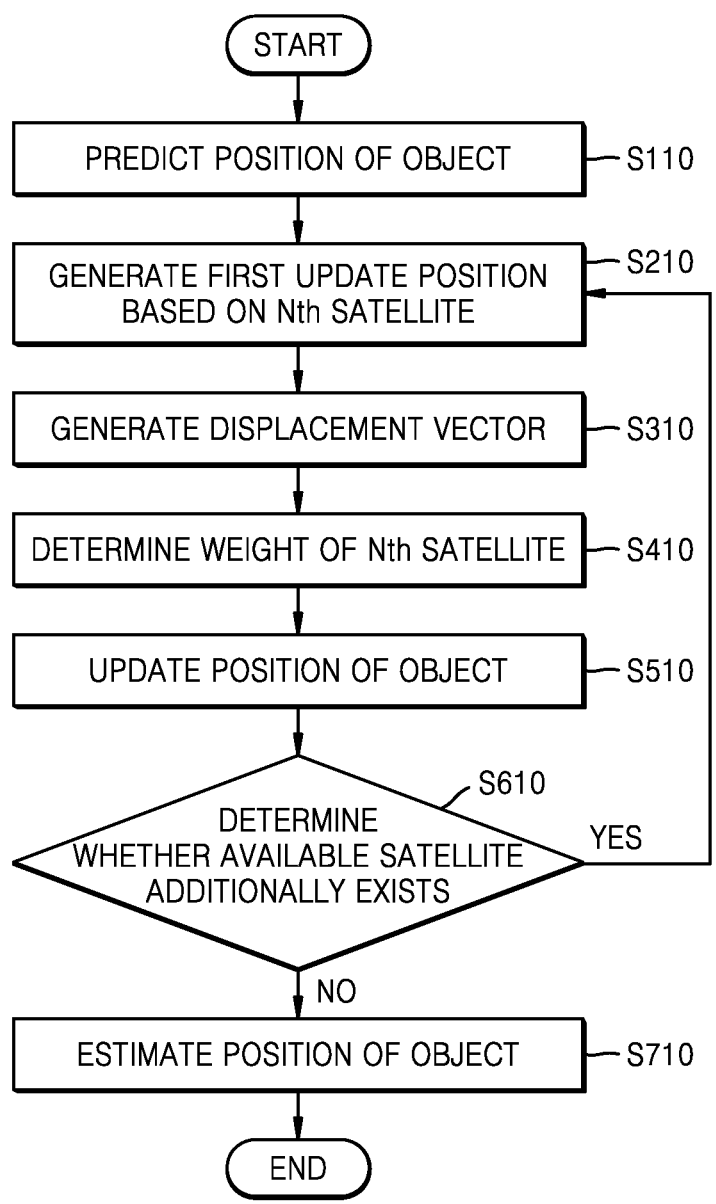
FIG. 13 is a flowchart of an example of a method for estimating a position of an object by determining weights of satellites according to an embodiment.

FIG. 13 is a flowchart of an example of estimating a position of an object by determining weights of satellites.

The GNSS processor 130 according to the embodiment of FIG. 1 may update the position of the object that is estimated based on the compensated position after generating the compensated position associated with the target satellite. However, one or more embodiments are not limited thereto, and referring to the GNSS processor 130 of FIG. 13, the GNSS processor 130 may predict the position of the object according to velocity of the object at the previous time and may estimate the position of the object by generating the compensated position associated with each satellite.

In operation S110, the GNSS processor 130 may predict the position of the object according to the velocity of the object. In this case, the GNSS processor 130 may estimate the velocity of the object according to a variance in pseudo ranges of the object at two different points in time and may predict the position of the object by applying the equation of motion to the estimated velocity of the object. The predicting of the position of the object is described with reference to FIG. 6, and thus, the detailed descriptions thereof will be omitted.

In operation S210, the GNSS processor 130 may generate a first update position based on an $n^{th}$ satellite. For example, the GNSS processor 130 may generate the compensated position associated with the $n^{th}$ satellite from among a plurality of satellites. The compensated position may be different from the position of the object that is estimated in operation S110 and may be a position estimated according to a pseudo range between the $n^{th}$ satellite and the object.

In operation S310, the GNSS processor 130 may generate the displacement vector based on the compensated position and a previous position that is estimated at the previous time. The displacement vector may be a vector that is generated based on a difference between the compensated position and the previous position.

In operation S410, the GNSS processor 130 may compare the displacement vector with the velocity vector and may determine a weight of the $n^{th}$ satellite. The descriptions that the GNSS processor 130 compares the displacement vector with the velocity vector and determines the weight according to a comparison result are provided with reference to FIGS. 9 to 12, and thus, the detailed descriptions will be omitted.

In operation S510, the GNSS processor 130 may update the position of the object according to the weight and the compensated position associated with the $n^{th}$ satellite. In this case, a reflection degree may be determined to estimate the position according to the weight of the $n^{th}$ satellite. For example, when the weight of the $n^{th}$ satellite is "0", the GNSS processor 130 may exclude the compensated position associated with the $n^{th}$ satellite when the position of the object is estimated.

In operation S610, the GNSS processor 130 may determine the compensated position associated with the nth satellite as a position and may determine whether another available satellite, which may be used to update the position of the object, additionally exists. When the satellite, which may be used to compensate the position of the object, additionally exists, the GNSS processor 130 may generate a compensated position associated with the additional satellite and may determine a weight of the additional satellite. That is, the process may return to operation S210 and a first update position may be generated based on the additional satellite.

When there exists no additional satellite that may be used to compensate the position of the object, the GNSS processor 130 may estimate the position, which is compensated by the satellites, as a final position of the object in operation S710. That is, the GNSS processor 130 may estimate the final position of the object based on the weighted compensated positions from plural satellites.

While various embodiments have been particularly shown and described, it will be understood that various changes in form and details may be made therein without departing from the spirit and scope of the following claims.

What is claimed is:

1. A method of compensating a position of an object by using a GNSS (Global Navigation Satellite System) processor, the method comprising:
   receiving position information from each of a plurality of satellites;
   calculating a pseudo range from the object to each of the plurality of satellites;
   generating a compensated position at a compensation target time based on the position information and based on the pseudo range between the object and a target satellite of the plurality of satellites at the compensation target time;
   generating a displacement vector of the object based on the compensated position at the compensation target time and a previous position of the object at a previous time that is prior to the compensation target time;
   determining a weight for the target satellite, based on a velocity vector at the compensation target time and the displacement vector; and
   compensating a predicted position of the object according to the weight and the compensated position.

2. The method of claim 1, wherein the determining of the weight comprises:
   comparing the velocity vector with the displacement vector; and
   determining the weight for the target satellite based on a result of the comparing.

3. The method of claim 2, wherein the comparing comprises generating inner product values of the velocity vector and the displacement vector as the result of the comparing, and
   the determining the weight comprises determining the weight by comparing the inner product values with a reference inner product value.

4. The method of claim 2, further comprising:
   predicting the position of the object at the compensation target time according to an equation of motion related to the object; and
   outputting the predicted position as a final position.

5. The method of claim 4, further comprising estimating the velocity vector at the compensation target time based on a variance in pseudo ranges between the object and the target satellite at the compensation target time and the previous time.

6. The method of claim 2, wherein, in the compensating the predicted position, when a difference between the velocity vector and the displacement vector is less than a threshold value, the compensated position associated with the target satellite is ignored.

7. The method of claim 1, further comprising predicting the velocity vector by filtering at least one of velocity information of the object, position information, a variance in the pseudo range, a position change of the target satellite, and a Line of Sight (LoS) vector at the compensation target time by using a Kalman filter.

8. A method of estimating a position of an object by using a GNSS (Global Navigation Satellite System) processor, the method comprising:
   predicting the position of the object at a compensation target time, according to a velocity of the object;
   for each of a plurality of satellites, generating a compensated position for compensating the predicted position of the object with respect to the satellite, according to a pseudo range between the satellite and the object at the compensation target time;
   generating a displacement vector of the object for each of the plurality of satellites, based on the compensated position and a previous position of the object at a previous time with respect to the compensation target time;
   determining a weight with respect to each of the plurality of satellites, based on the displacement vector for each of the plurality of satellites and a velocity vector at the compensation target time; and
   estimating the position of the object based on the predicted position of the object, the weight with respect to each satellite, and the compensated position with respect to each satellite.

9. The method of claim 8, wherein the determining the weight comprises:
   comparing the displacement vector for each of the plurality of satellites with the velocity vector; and
   determining the weight with respect to each satellite according to a result of the comparing.

10. The method of claim 9, wherein the comparing comprises generating inner product values of the displacement vector for each of the plurality of satellites and the velocity vector as the result of the comparing, and
   the determining the weight comprises determining the weight with respect to each satellite by comparing the inner product values with a reference inner product value.

11. The method of claim 9, wherein the estimating the position of the object comprises estimating, as the position, a third position generated based on the predicted position of the object and the compensated position to which the weight is applied.

12. The method of claim 9, wherein the estimating the position of the object comprises ignoring the compensated positions of satellites, from among the plurality of satellites, for which a difference between the velocity vector and the displacement vector is less than a threshold value.

13. The method of claim 9, further comprising estimating the velocity vector with respect to the plurality of satellites by compensating the velocity vector being predicted at the compensation target time, based on a variance in pseudo ranges between the object and each of the plurality of satellites at the previous time and the compensation target time.

14. The method of claim 8, further comprising predicting the velocity vector by filtering at least one of velocity information of the object, position information, a variance in the pseudo range, a position change of each satellite, and a Line of Sight (LoS) vector at the compensation target time by using a Kalman filter.

15. A method of estimating a position of an object by using a GNSS (Global Navigation Satellite System) processor, the method comprising:
predicting the position of the object and a velocity vector at an estimation target time according to the position of the object and a velocity vector at a previous time that is prior to the estimation target time;
compensating the predicted velocity vector based on a variance in pseudo ranges at the estimation target time and the previous time;
generating a compensated position for each of a plurality of satellites based on a pseudo range between the object and the satellite at the estimation target time;
generating a displacement vector of the object based on the compensated position and a previous position of the object at the previous time;
determining a weight for each satellite based on the compensated velocity vector and the displacement vector; and
estimating the position of the object based on the predicted position, the weight of each satellite, and the compensated position of each satellite.

16. The method of claim 15, wherein the estimating comprises comparing the velocity vector with the displacement vector, and determining the weight for each satellite according to a result of the comparing.

17. The method of claim 16, wherein the estimating comprises:
generating inner product values of the velocity vector and the displacement vector as the result of the comparing; and
determining the weight of each satellite by comparing the inner product values with a reference inner product value.

18. The method of claim 16, wherein the estimating comprises ignoring the compensated positions of satellites, from among the plurality of satellites, for which a difference between the velocity vector and the displacement vector is less than a threshold value.

19. The method of claim 15, wherein the position of the object at the estimation target time is predicted according to an equation of motion of the object.

20. The method of claim 15, wherein the predicting the position comprises predicting the velocity vector by filtering at least one of velocity information of the object, position information, variances in the pseudo ranges, a position change of the plurality of satellites, and a Line of Sight (LoS) vector at the estimation target time by using a Kalman filter.

* * * * *